Jan. 22, 1957 H. J. OSTERMANN ET AL Re. 24,267

ELECTRONIC DISPLACEMENT MEASURING MEANS

Original Filed Sept. 14, 1944 5 Sheets-Sheet 1

INVENTORS
HANS J. OSTERMANN
ARNO G.K. WILKENS
CHARLES B. BRYAN
BY Darby + Darby
ATTORNEYS.

ELECTRONIC DISPLACEMENT MEASURING MEANS

Original Filed Sept. 14, 1944 5 Sheets-Sheet 2

INVENTORS
HANS J. OSTERMANN
ARNO G. K. WILKENS
BY CHARLES B. BRYAN
Darby & Darby
ATTORNEYS.

ELECTRONIC DISPLACEMENT MEASURING MEANS

Original Filed Sept. 14, 1944 5 Sheets-Sheet 3

INVENTORS
HANS J. OSTERMANN
ARNO G. K. WILKENS
BY CHARLES D. BRYAN
Darby & Darby
ATTORNEYS.

ELECTRONIC DISPLACEMENT MEASURING MEANS

Original Filed Sept. 14, 1944 5 Sheets-Sheet 4

INVENTORS
HANS J. OSTERMANN
ARNO G. K. WILKENS
CHARLES B. BRYAN
BY Darby & Darby
ATTORNEYS.

ELECTRONIC DISPLACEMENT MEASURING MEANS

Original Filed Sept. 14, 1944 5 Sheets-Sheet 5

INVENTORS
HANS J. OSTERMANN
ARNO G. K. WILKENS
CHARLES B. BRYAN
BY Darby & Darby
ATTORNEYS United States Patent Office Re. 24,267
Reissued Jan. 22, 1957

24,267

ELECTRONIC DISPLACEMENT MEASURING MEANS

Hans J. Ostermann, Westport, Arno G. K. Wilkens, Shelton, and Charles B. Bryan, New Haven, Conn., assignors to Manning, Maxwell & Moore, Inc., Bridgeport, Conn., a corporation of New Jersey Original No. 2,593,339, dated April 15, 1952, Serial No. 554,128, September 14, 1944. Application for reissue April 1, 1954, Serial No. 427,403

(Filed under Rule 47(a) and 35 U. S. C. 116)

13 Claims. (Cl. 340—187)

Matter enclosed in heavy brackets [ ] appears in the original patent but forms no part of this reissue specification; matter printed in italics indicates the additions made by reissue.

This invention relates to electro-mechanical means including electronic transmission system for measuring displacements representative of variables to be measured such as pressures, temperatures, fluid flow and the like.

The basic object of this invention is the provision of an apparatus by means of which the physical displacements of a member in response to temperature and pressure changes, the rate of flow of fluids and similar variables may be converted by means of an electron transmission system into electric currents or voltages directly proportional to such displacements and in turn converted into accurate visible indications of the quantitative values thereof or employed through control devices to maintain them at desired values.

The general combination of this invention includes:

1. A primary responsive element adapted to respond to a variable to be measured;
2. A variable gap-control device operated by said primary responsive element;
3. A gap-controlled current or voltage source having an output variable in response to said gap control;
4. A coupling network adapted to feed the output of said current or voltage source to a plurality of electro-responsive devices, in predetermined magnitude and phase relations;
5. An electro-responsive device associated with said output network and operatively connected to said control gap so as to superimpose its influence on said control gap and said primary responsive elements in a predetermined ratio; and
6. A plurality of electric meters, recorders or control devices, calibrated in terms of the input variable of said primary responsive element, connected to said output network.

By means of such a combination constructed in accordance with the invention herein disclosed, it is possible:

1. To indicate the magnitude of the variable being measured at a plurality of points at different locations;
2. To use a plurality of different types of standard meters, recorders and the like;
3. To obtain a plurality of simultaneous separate indications as required;
4. To operate selectively a single indicator or recorder by means of a plurality of transmitters built in accordance with this invention;
5. To multiply, as required, the size of the indications representative of the variables thereby obtaining greater accuracy of indication;
6. To use standard electric meters or recorders to accurately measure any type of mechanical variations;
7. To produce sufficient power in the indicating transmission lines to operate a relay or other control device without impairment of meter readings taken from the same transmission lines; and 8. To employ indicating meters having linear scales.

Other and more detailed objects of the invention will be apparent from the following disclosures of several embodiments or applications thereof as illustrated schematically in full detail in the attached drawings.

This invention resides substantially in the combination, construction, arrangement, relative location of parts, steps and series of steps, all as will be described in detail below.

Figure 1:
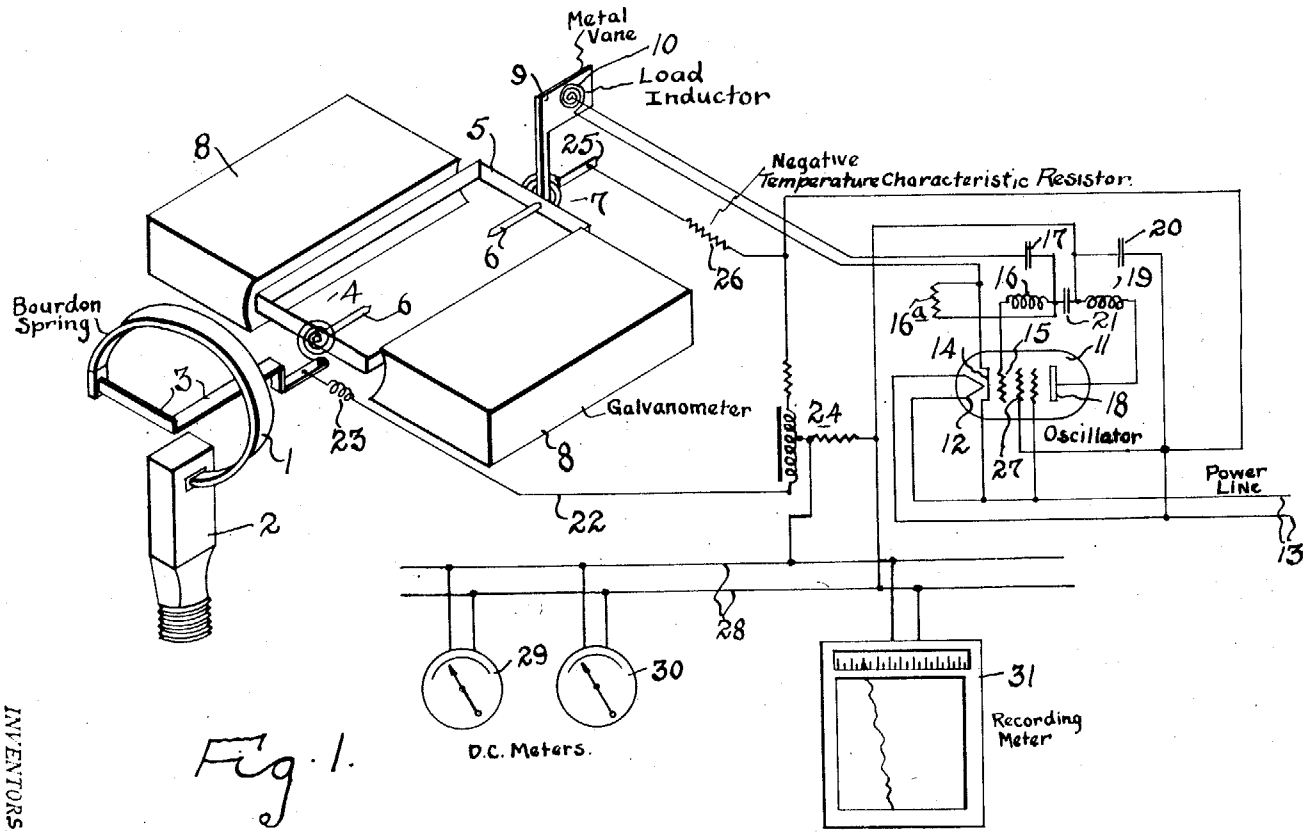
Figure 1 is a schematic and diagrammatic illustration of an application of the principles of this invention to a fluid pressure measuring system.
Figure 2:
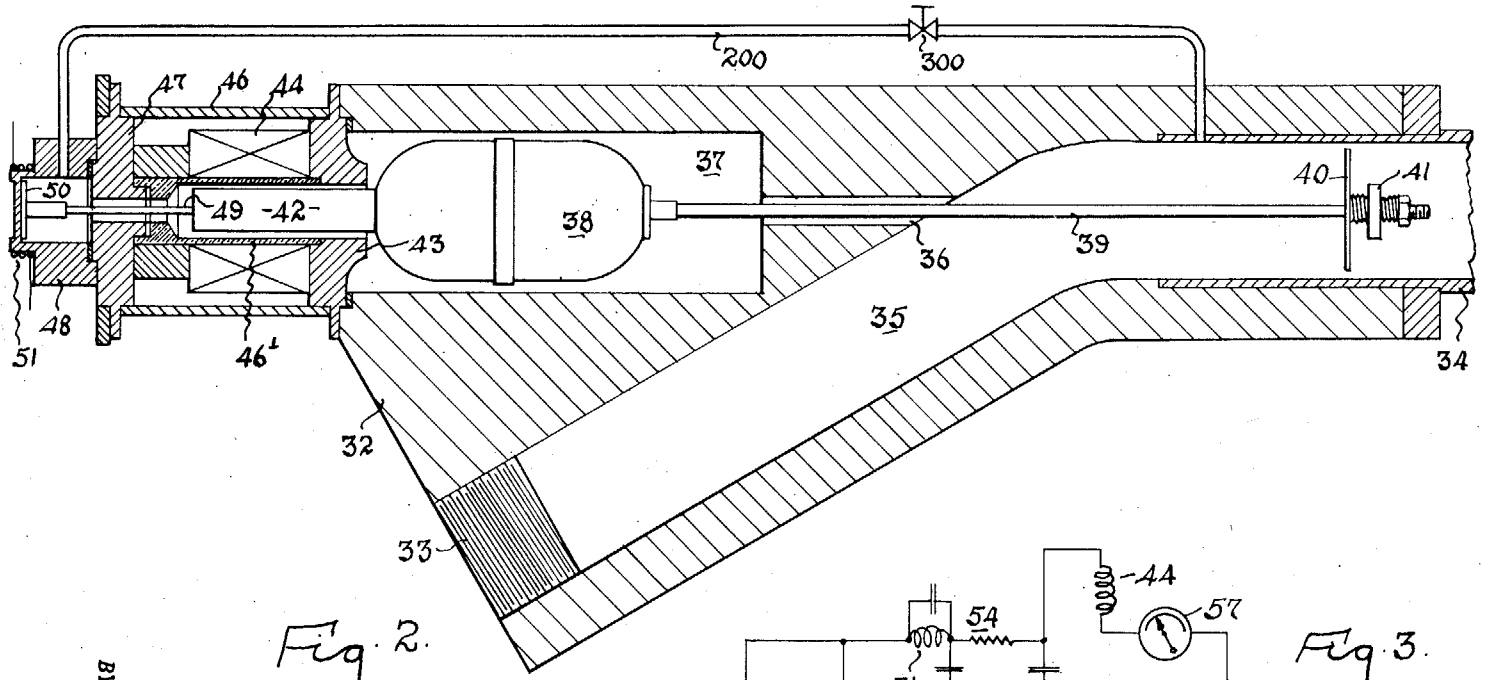
Figure 2 is a longitudinal, central, cross-sectional view through another form of the invention as applied to an instrument for measuring the rate of fluid flow through a conduit.

The subject matter of the invention herein disclosed is illustrated in Figure 1 as applied a system for continuously measuring fluid pressure variations. The source of fluid pressure, not shown, will be connected by means of a pipe to the coupling and supporting element 2 of a Bourdon spring 1. The free end of this spring is connected by a leverage system 3 through a spring 4 to a coil 5 mounted on pivots 6 in suitable bearings, not shown. Another spring 7 is connected to the opposite end of the coil 5 and anchored on a fixed support 25 so that rotational movement of the coil 5 on the pivots 6 is controlled by the light hair springs 4 and 7. The coil 5 is, as shown, rotatatively mounted in the field of a magnetic system which, in the case illustrated, includes the permanent magnets 8. It is apparent that the structure 5—8 and its associated parts comprises a common form of galvanometer well known in the electrical arts.

Connected to the movable coil 5 is a metal vane 9 which rotates with it and when in central normal position is separated by a small gap from coil 10. This coil is a load across the input grid circuit of a Hartley oscillator including the pentode 11. The heater 12 for the cathode 14 of the pentode is supplied with energizing current from the power line 13. The inductor 10 and capacitor 17 constitute a series tuned load circuit on the oscillator system consisting of tube 11, grid inductor 16, blocking capacitor 21 and plate inductor 19. The resistor 16a provides a proper D. C. return for grid 15. The connection including the condenser 20 places the lead from 24 to the junction at 19—21 at ground radio frequency potential. The oscillator illustrated is but one form of many well known vacuum tube oscillator circuits suitable for the purposes of this invention. The output circuit is coupled by means of connections, as shown, including the screen grid 27 to a coupling network illustrated at 24. As shown, this network includes an inductor and a resistor in series in the circuit and a second resistor shunted across the circuit and connected to a tap on the inductor. This particular form of coupling network is merely illustrated by way of example since, as will be apparent to those skilled in the electrical arts, there are many other suitable forms of coupling circuits for connecting the output of the oscillator with the instrument line 28.

For the purpose of illustrating the adaptability of the invention, two D. C. voltmeters 29 and 30 are shown connected in the indicating line 28 as well as a recording meter 31. These various meters may be distributed at any desired points with respect to the rest of the system so as to give a plurality of indications at relatively different points.

The coil 5 of the galvanometer is also connected in the output circuit of the oscillator across the coupling network 24 by means of the wire 22 including the flexible connection 23 to the lever system 3. One terminal of the coil 5 is connected to the hair spring 4 in a well known manner and the other terminal is connected to the hair spring 7 in a well known manner and the circuit is completed through the anchor 25 for the hair spring and a resistor 26 having a negative temperature coefficient back to the other side of the network 24.

In the operation of this apparatus when the fluid under pressure is supplied to the Bourdon spring 1 its free end will move, causing a rotational movement of the lever system 3, and hence of the coil 5 through its hair spring connection with the lever system. The parts are arranged so that rotation of the coil 5 in the structure, as illustrated, will be in a clockwise direction so that the metal vane 9 will approach the coil 10. This movement of the metal vane 9 in the field of the coil 10 will change its apparent inductance and thus vary the degree of resonance between the load and the oscillator, increasing the flow of current in the tuned plate circuits thereof. This change of current in the plate circuit will appear as an indication on the meters 29 and 30 and a permanent record thereof will be made on the recording meter 31. A portion of the current flowing through the network 24 will feed to the coil 5 creating a magnetic field therearound which will react with the field of the permanent magnets 8 to counterbalance the force applied to the coil by means of the Bourdon spring 1. Thus for a particular fluid pressure supplied to the Bourdon spring 1 the coil 5 will take a fixed position which means that the oscillator will continue to generate for that position of the apparatus a current the strength of which will be a direct measure of the magnitude of the pressure on the fluid, and hence the meters when properly calibrated will give a direct indication and make a record of the pressure on the fluid. The values of the various circuit elements are so proportioned that for each position of the galvanometer and associated parts a current of corresponding magnitude will be fed to the meters and, as stated, when properly calibrated will give a direct indication of the fluid pressure applied to the Bourdon spring. The resistor 26 by reason of its well known characteristics will contribute its function to cause an accurate position of the coil 5 and hence a correct balance of forces in the instrument under varying ambient temperature to insure an accurate indication on the meters. As previously stated, the parts may be proportioned so that the current flowing in the indication circuit 28 can be made of sufficient magnitude so that it is not only possible to operate a plurality of meters but to effect operation of control devices such as relays and the like without disturbing the accuracy of the meter readings. By way of further example, this system may be designed in accordance with known electrical skill so that it is possible to supply as much as 30 to 40 ma. to a load of 2500 ohms D. C., suffifficient power to operate 100 ordinary 30 ma., 50 mv., D. C. switchboard meters simultaneously or operate a lesser number of meters and a relay to control any other desired function without impairing the meter readings.

The flowmeter application as illustrated herein will now be described in connection with Figures 2 to 5 inclusive. In this more specific application of the subject matter of this invention, the electro-mechanical force relationships involved will be described in greater detail. Briefly, however, the meter as illustrated is adapted to measure the rate of flow of any liquid and specifically, for example, for measuring the flow of gasoline in the fuel line of an airplane.

The device includes a casting or housing 32 having a passage 35 therein to which a fuel supply line may be connected at the threaded port 33. This passage extends gradually into the supply pipe connection 34 extending beyond the meter as, for example, to a gasoline engine. Beyond the point of curvature of the passage 35 at a point of minimum turbulence in the fluid stream is mounted a force plate or disc 40. This disc is mounted upon a rod 39 extending axially of the passage by any suitable means by which it may be locked thereon and the rod is provided with an adjustable counterweight 41. The rod 39 extends backwardly through a passage 36 which interconnects the passage 35 with a chamber 37 in the housing 32. Within the chamber 37 and attached to the rod 39 is a float 38 to the other end of which is secured a soft iron core or armature 42.

The outer end of the chamber 37 is closed by means of a plate 43 having a passage therethrough into which the armature 42 extends. Mounted on an annular shoulder on the outer face of the closure member 43 is a tubular housing 46 the outer face of which in turn is closed by means of an apertured plate 47. Extending between the plates 43 and 47 is a tube 46' into which the armature 42 projects and upon which is mounted a solenoid winding 44. Sealed on the outer end of the closure 47 is a closed housing 48, the interior of which communicates with the chamber 37 by means of the passages through the closure 43, the tube 46' and the closure 47. Attached to the end of the armature 42 by means of a rod or shaft 49 is a metal disc 50 preferably of aluminum. This disc is normally positioned so as to be within the field of a winding 51 which may be termed a sensing winding. The chamber within the housing 48 may be placed in communication with the passage 35 by means of a venting pipe 200 which includes the adjustable valve 300.

Figure 3:
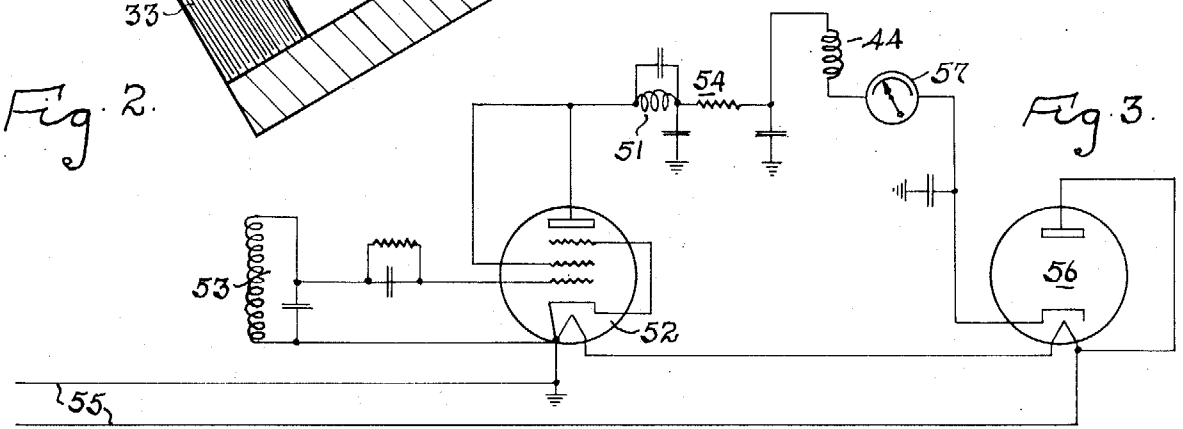
Figure 3 is a diagrammatic circuit illustration of the electronic transmission system used with the structure of Figure 2.

The circuit in which the solenoid 44 and the sensing coil 51 is included is shown in Figure 3. This circuit includes an oscillator comprising a pentode 52 having tuned grid and tuned plate circuits. The tuned grid circuit is diagrammatically illustrated at 53 and the tuned plate circuit at 54. This circuit includes the sensing coil 51. A power supply circuit 55 supplies the energizing current for the heater of the pentode 52 and the heater of the diode 56. The diode is connected in series with the circuit 55, the indicating milliammeter 57, the solenoid 44 and the tuned plate circuit 54. Here again it may be noted that the particular form of oscillator circuit is capable of many variations and that shown in Figure 3 is merely illustrative.

Before discussing the operation of the flow-meter a brief reference to the theoretical principles involved in its operation will be helpful in understanding its full capabilities. By the laws of hydraulics and magnetism the force on the plate 40 in the stream of flowing fluid is proportional to the square of the velocity of the fluid while the force exerted by the solenoid is proportional to the square of the electric current energizing it. By a proper design of the solenoid the force exerted by it may be made independent of the position of the armature 42 over the range of displacements encountered in its normal operation.

In mathematical terms:

$$F_M = F_F$$
$$F_M = K_M I^2$$
$$F_F = K_F v^2$$

whence $$K_M I^2 - K_F v^2$$

$$I = v\sqrt{\frac{K_F}{K_M}} = Kv$$

where:
$F_M$=magnetic force
$F_F$=fluid force
$K_M$=solenoid constant
I=electric current
$K_F$=constant
v=linear velocity of the fluid $$K = \text{constant} = \sqrt{\frac{K_F}{K_M}}$$

From this it is evident that an ordinary D. C. milliammeter inserted in series with the solenoid coil as shown in Figure 3 could be calibrated to read fluid velocity directly on a linear scale. The housing 32 is so constructed and the force plate 40 is so positioned that turbulence in the flowing stream is kept to a minimum. This is accomplished by locating the force plate in a straight section of the channel 35, by making the bend in the channel gradual and by locating the major part of the moving element in a duct where it does not interfere with the stream of fluid.

The general law representative of the movement of the plunger of the electro-magnet is that the force on the plunger is a function of the current squared and of the position of the plunger with respect to the solenoid winding. The latter provision would prevent linear calibration of the flow meter scale and would cause the initial positioning of the plunger to be a critical adjustment. Therefore, the magnetic system should be developed in accordance with known principles so that over the range of displacements used the force on the plunger is virtually independent of its position.

The electronic circuit shown in Figure 3 includes a tuned plate tuned grid oscillator with the solenoid coil inserted in series with the power supply. The coil 51 of the tuned plate circuit is a sensing coil which is loaded by inductive coupling with the metal, preferably aluminum, "sensing disc" 50 of the moving element of the meter. As the distance between the sensing disc and the sensing coil is varied by displacement of the force plate 40 the loading of the oscillator is changed. Accordingly the oscillator draws a greater or lesser amount of power, this current from the power supply changing the current in the solenoid coil 44. Thus the force applied to the float system is balanced by the magnetic force of the solenoid 44 to hold the moving element of the system in each position corresponding to the particular rate of flow of the moment.

The float 38 is provided on the moving element to balance the effect of gravity permitting the flowmeter to be operated in any position without the introduction of errors due to the weight of the moving system. It also minimizes the pressure of the moving system on any bearing members that may be employed and consequent friction. The venting pipe 200 and valve 300 are employed as a bleeder connection from the sensing head to the duct to prevent the possibility of the formation of air pockets which would interfere with the accuracy of the device. It was found from actual experience that by varying the adjustment of valve 300 a variable hydraulic force was introduced into the system which opposed the main fluid force and reduced the flowmeter reading for any given flow. Thus this venting system would provide, if desired, means for calibrating the meter or in conjunction with a thermostat provide for temperature compensation.

Figure 4:
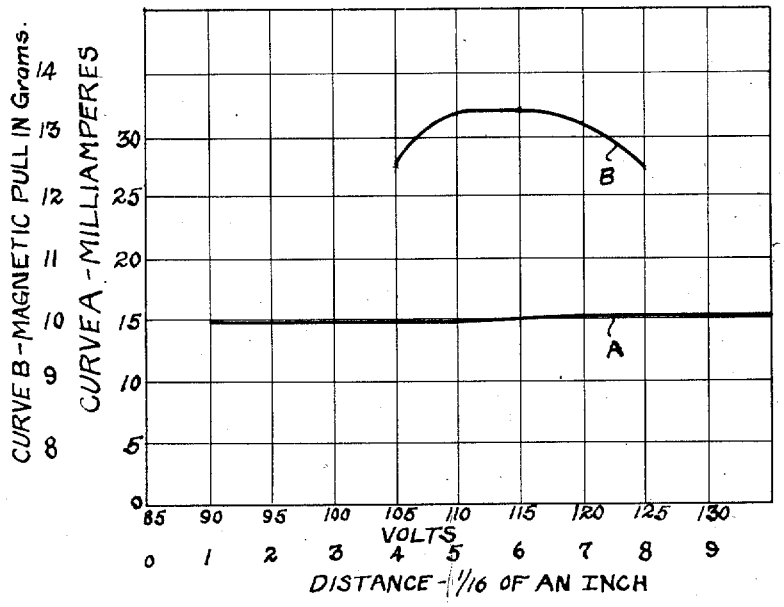
Figures 4 and 5 are charts of several characteristics of such a flowmeter.
Figure 5:
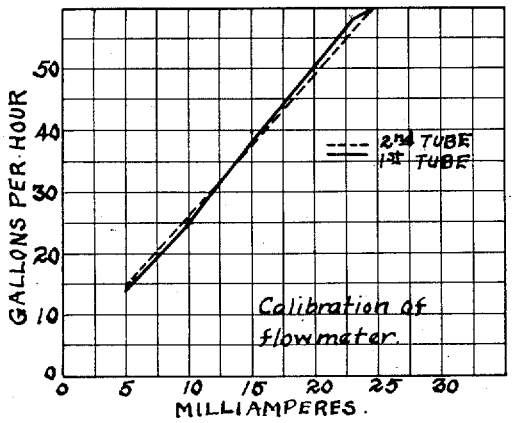

Referring to the charts shown in Figures 4 and 5, curve B of Figure 4 is a plot of the magnetic pull of the solenoid 44 in grams at a constant current energization for displacements of the armature 42 in 16th of an inch. The central portion of this curve is substantially flat showing that when properly designed the field strength of the solenoid is substantially constant over a useful range of displacements thereof. Curve A of Figure 4 is a graph of the effect of variations of the supply current voltage on the meter indications showing that when properly designed the flow meter may be made independent of all reasonable fluctuations of voltage in the supply system 55.

The graph of Figure 5 represents calibration curves of the device employing two different pentodes, that is two different tubes of the same kind, namely 117 N7GT tubes. Thus it will be seen that the effect of substituting one tube of the same kind for another is relatively unimportant on the accuracy of the meter.

From the above it will be apparent that a meter of this type may be readily constructed which will give a very accurate indication on a milliammeter properly calibrated of the rate of fluid flow through a pipe or other channel.

The subject matter of this invention is also illustrated in Figures 6 to 9 inclusive, as applied to an apparatus for measuring and transmitting torque and displacement values. An important advantage of a system of this kind is its ability to measure very small values of torque and displacement. This is accomplished in the system illustrated by translating the input variable of torque or displacement quantitatively into an electric current which can be measured to a high degree of accuracy on an ordinary D. C. meter. By the system illustrated, values of torque may be measured which are considerably smaller than those available from such devices as Bourdon tubes, diaphragms and the like.

Figure 6:
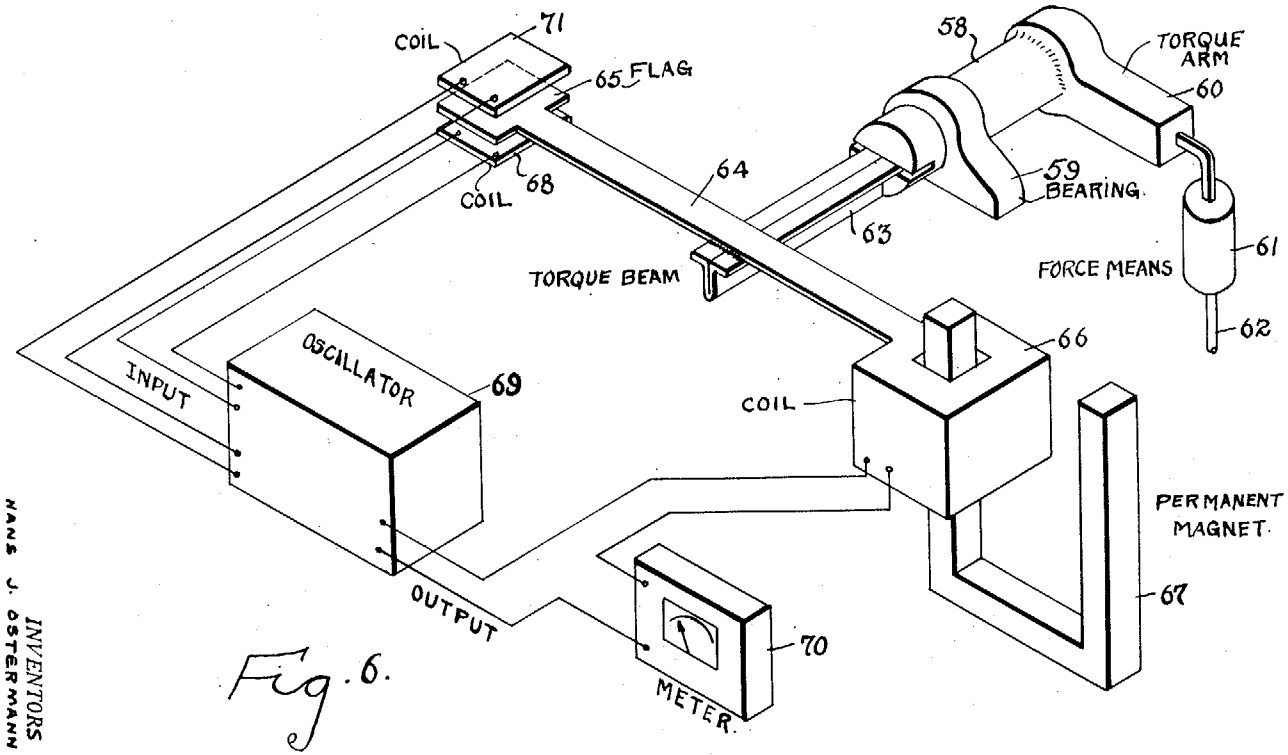
Figure 6 is a diagrammatic and schematic illustration of another form of the invention as applied to measuring the angular displacement of a lever.

The essential parts of such a system are illustrated in Figure 6. Rotatably mounted in a fixed bearing 59 is a shaft 58 to which a torque arm 60 is attached. For illustrative purposes the torque arm is shown connected to the piston of a cylinder 61 fed by pressure fluid through the pipe connection 62. It will be apparent that any other force to be measured can be applied in any suitable manner to the arm 60 and it will be understood, therefore, that the force means illustrated is given as an example only. A torque beam 63 is rigidly mounted in the end of the shaft 58. As illustrated, this torque beam is formed by bending a thin sheet of suitably resilient material such as, for example, beryllium copper 0.0015 inch thick, into a bar of T-shaped cross-section. This arrangement is more rugged than pivots and bearings and is less affected by dirt. Secured as, for example, by welding to the top face of the torque beam 63 near its free end is an arm 64 which terminates at one end in a metal plate 65 positioned between a pair of coils 68 and 71. Mounted on the other end of the arm 64 is a solenoid coil 66 through the center of which extends one leg of a permanent magnet 67. A D. C. millimmeter 70 is connected to the output of the oscillator 69 in series with the coil 66. The coils 68 and 71 are connected in the input and output circuits of the oscillator 69 as diagrammatically illustrated in Figure 6.

Figure 7:
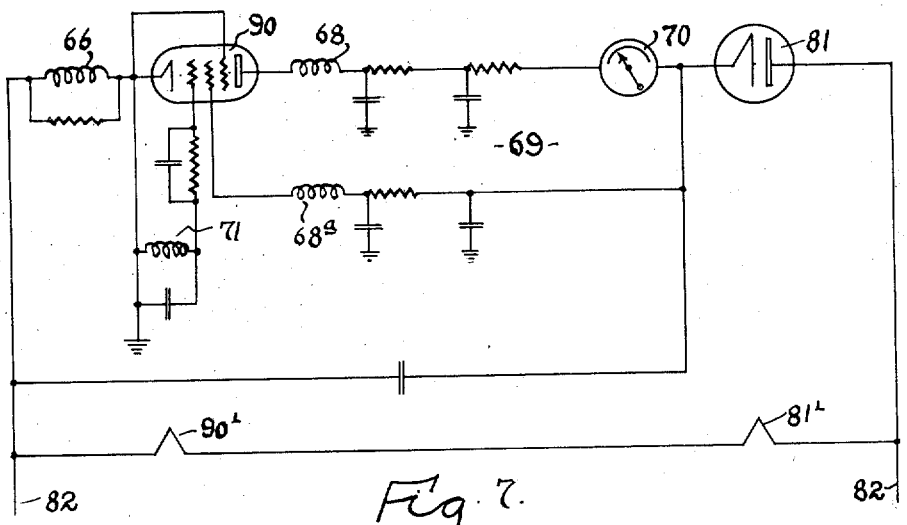
Figure 7 is a diagrammatic illustration of the circuit portion of the apparatus of Figure 6.

The oscillator is shown in greater detail in Figure 7. It includes a pentode 90 having a tuned grid and tuned plate circuit as illustrated. The coils 68 and 71 are included in the tuned plate and tuned grid circuits, respectively, of the pentode, as shown, which coils, as previously mentioned, are in the control gap and positioned at opposite sides of the moving flag or vane 65. The tuned plate circuit includes the indicating milliammeter 70 and a diode 81 is connected in the power supply circuit which includes leads 82 and across which the heaters 90' and 81' for the pentode and diode, respectively are connected. Here again the specific circuit arrangements are immaterial since various equivalents thereof are well known in the electronic arts.

In the operation of this device, when a fluid under a particular pressure is supplied to the cylinder 61 through the pipe 62, the arm 60 is displaced an amount proportional to the pressure thereof, causing rotation of shaft 58, beam 63 and arm 64. Movement of arm 64 displaces the vane 65 bringing it nearer to one of the coils 68 and 71 and moving it further from the other effecting detuning of the plate and grid circuits in proportional relative amounts. The coils 68 and 71 being in the tuned circuits cause an alteration of the ratio of exciting voltage to A. C. plate-cathode voltage causing the oscillator to draw more or less current from the power supply. This current is applied both to the indicating meter 70 and to the solenoid 66 developing a magnetic field in the latter which reacts upon the field of the permanent magnet 67 to apply a torque to the beam 63 sufficient to be equal to but opposite in direction to the torque applied to the arm 60. The torque beam forces are then balanced and the current in the coil 66 is a direct measure of the applied torque. Thus when the meter 70 is properly calibrated is may be made to read directly angular displacement or linear displacement for any given torque arm as well as torque.

If desired, a coil 68[a], which may be physically wound in with coil 68, may be connected in the screen grid circuit as shown to cause a stronger oscillator action and hence a stronger indicating current for any particular displacement of the system.

The following discussion may be helpful in further appreciating the operation of this system. The coil 66 is linked with the magnetic flux of the permanent magnet 67. When the current flows in the coil 66 it becomes an electromagnet and the connections should be so arranged that its polarity is opposite to that of the permanent magnet. Consequently a current flowing in the coil 66 produces a force of repulsion the intensity of which is proportional to the strength of the current. The torque which is to be measured is applied to the torque beam and by means of the control gap and gap controlled current source 69 the current in the coil 66 is increased until the torque due to the electro-mechanical system is equal and opposite to the applied torque. The torque beam is then balanced and the current at this time in the coil 66 is a measure of the applied torque.

Displacement is measured by means of the Hooke's law relationship which exists between applied torque and torisonal deformation of the torque beam 63. This beam is intentionally made flexible in torsion so that any torque applied produces a corresponding angular twist. Thus the meter 70 may be calibrated to read angular displacement or linear displacement for any given torque arm as well as torque. It is to be noted that the displacement which it is desired to measure is the angular distance travelled by the applied force, whereas the displacement actually measured is the angular twist in the torque beam. There is a slight difference between these two quantities due to the fact that a small amount of rotation of the cross arm is required to actuate the gap-controlled current source. Consequently, a slight theoretical error exists in displacement measurements, but this may be made negligible by proper design.

In mathematical terms the basic operation of the system may be stated as follows:

$$T_t = F_t l_t = K_t I \phi l_t = KI$$

where $T_t$=torque produced by electro-mechanical transducer
$K_t$=force between magnet and coil$=K_t\phi I$
$K_t$=design constant of the transducer
$I$=current in the transducer coil
$\phi$=permanent magnet field
$l_t$=lever arm of the transducer, measured to the axis of rotation of the torque beam
$K$=constant$=K_t\phi l_t$ If $T_a$=the applied torque, then, when the system is balanced:

$$T_a = T_t = KI$$

This relation shows that, at balance, the current in the transducer coil is proportional to the applied torque.

Since the torque is transmitted through the flexible torque beam, $$T_t = K_b\theta_b$$

where $K_b$=elastic constant of the beam
$\theta_b$=angle of twist of the beam

Let d=angular deflection of the cross arm required to operate the gap-controlled current source. Then $\theta_b + d = \theta_a$=angle travelled through by applied force From the above, at balance, $$T_a = T_t = K_b\theta_b = K_b\ (\theta a - d)$$

$$\theta_a = \frac{T_t + K_b d}{K_b}$$

Or, if d can be made negligible $$\theta_a = \frac{1}{K_b} T_t = \frac{K}{K_b} I$$

and the current flowing in the transducer coil is proportional to the angle travelled through by the applied force.

Figure 8:
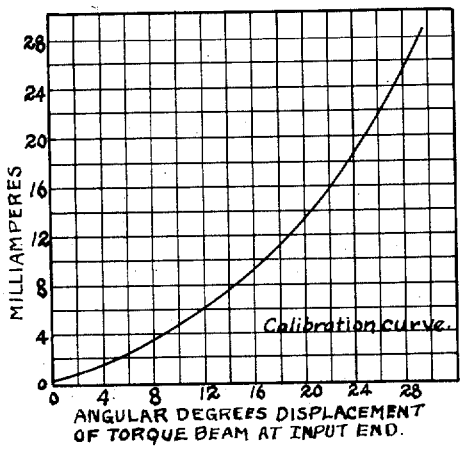
Figures 8 and 9 are charts of some operating characteristics of the system of Figure 6.
Figure 9:
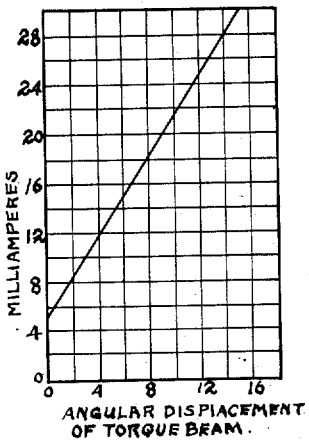

The charts in Figures 8 and 9 illustrate the calibration curve of one system made in accordance with this invention and the meter readings for various angular displacements of the torque beam, respectively. The chart of Figure 9 is an approximation which is accurate for all ordinary purposes and which varies little with variations in the input voltage of the system of Figure 7. In other words, the accuracy of the instrument is little affected by normal voltage variations of the usual power supply such as would be used.

It is believed that the above examples of various applications of the subject matter of this invention fully illustrate to those skilled in the art the fact that the subject matter of the invention is capable of considerable variation without departure from the basic subject matter thereof. The gap controlled source may, of course, have a variable output voltage instead of a variable output current, and therefore, it is intended to include both in the appended claims. We do not, therefore, desire to be strictly limited to the disclosure as given in an illustrative sense, but rather by the scope of the claims granted us.

What is claimed is:

1. In a control system, the combination including means having a planar control element displaceable in an amount proportional to the deviation of a variable from a preset condition, *an electrical* [a vacuum tube] oscillator having a planar [grid circuit] *control* inductor, movement of said control element in a line perpendicular to the plane of said inductor varying the output current of said oscillator, an output circuit including means energized by the oscillator output current for applying a force *to said displaceable means* in opposition to the displacement of said *displaceable* means *and* proportional to the output current, and a work circuit energized by said output current.

[2. In the combination of claim 1, said means energized by the output current comprising an electro-magnetic mechanical system connected with said displaceable means.]

[3. In the combination of claim 1, said displaceable means including a resilient member and said last means reacting on said resilient member.]

[4. In the combination of claim 1, said output circuit including an impedance, said means energized by the output circuit being connected across said impedance.]

5. In an electro-mechanical system for measuring displacement, the combination comprising a member including a metal vane displaceable by an applied force in an amount proportional to the change of a variable, a vacuum tube oscillator having an output circuit and a planar grid circuit inductor, movement of said metal vane in a path perpendicular to the plane of said inductor, and limited in its movement thereby, varying the output current of said oscillator, means connected to said output circuit and energized by the output current for applying a force *to said displaceable member* in opposition to the displacement of said member *and* proportional to said output current, and means also connected to said output circuit and calibrated in suitable units to indicate the values of said variable.

6. In an electro-mechanical system for measuring displacement, the combination comprising means including a resilient member displaceable by an applied force, a current source comprising *an electrical* [a vacuum tube] oscillator having an output circuit, means calibrated in suitable units to indicate the output values of said oscillator connected to said output circuit, electro-mechanical means conductively fed by said output circuit to apply a balancing force to said member to oppose the displacement thereof, an inductor for varying the output of said oscillator, and a metal vane relatively movable with respect to said inductor and operatively connected to said displaceable member and displaced by movements thereof to vary the tuning of said oscillator, said inductor comprising a pair of pancake coils disposed in parallel relation and said metal vane being moved by said displaceable member along a path at right angles to the planes of said pancake coils.

*7. In a control system, the combination including means having a planar control element displaceable in an amount proportional to the deviation of a variable from a preset condition, an electrical oscillator having a planar control inductor, movement of said control element in a line perpendicular to the plane of said inductor varying the output current of said oscillator, an electro-magnetic mechanical system energized by the oscillator output current and connected with said displaceable means for applying force to said displaceable means in opposition to the displacement of said displaceable means and proportional to the output current of said oscillator, and a work circuit energized by said output current.*

*8. In a control system, the combination of displaceable means including a resilient member and having a planar control element displaceable in an amount proportional to the deviation of a variable from a preset condition, an electrical oscillator having a planar control inductor, movement of said control element in a line perpendicular to the plane of said inductor varying the output current of said oscillator, an output circuit including means energized by said output current and reacting on said resilient member for applying a force to said displaceable means in opposition to the displacement of said displaceable means and proportional to the output current, and a work circuit energized by said output current.*

*9. In a control system, the combination including means having a planar control element displaceable in an amount proportional to the deviation of a variable from a preset condition, an electrical oscillator having a planar control inductor, movement of said control element in a line perpendicular to the plane of said inductor varying the output current of said oscillator, an output circuit for said oscillator including an impedance, means connected across said impedance and energized by current flow therethrough for applying a force to said displaceable means in opposition to the displacement of said displaceable means and proportional to said output current, and a work circuit energized by said output current.*

*10. In a control system, the combination including means having a planar control element displaceable in an amount proportional to the deviation of a variable from a preset condition, means including a planar control inductor positioned adjacent said control element for developing an output current which varies in accordance with movement of said control element in a line perpendicular to the plane of said inductor, an output circuit including means energized by said output current for applying a force to said displaceable means in opposition to the displacement of said displaceable means and proportional to said output current, and a work circuit energized by said output current.*

*11. In an electro-mechanical system for measuring a variable, the combination including a displaceable member having a control element provided with a planar control surface and displaceable in an amount proportional to the change in a variable to be measured, torsionally resilient mounting means for supporting said member and including at least one element of* L*-shaped cross section, angular displacement of said member causing movement of said control element in a direction substantially perpendicular to the plane of said control surface, a control inductor so positioned adjacent said control element that movement of said element in said direction causes a variation in the inductance of said control inductor, a source of output current variable in accordance with changes in said control inductor and connected thereto, means energized by said output current for applying a force to said member in opposition to the displacement of said member, and a work circuit energized by said output current.*

*12. In an electro-mechanical system for measuring a variable, the combination including a displaceable member having a control element provided with a planar control surface and displaceable in an amount proportional to the change in the variable to be measured, torsionally resilient mounting means for supporting said member and including a mounting element having a thin resilient web portion and at least one thin resilient flange portion extending substantially at right angles to said web portion, angular displacement of said member causing movement of said control element in a direction substantially perpendicular to the plane of said control surface, a control inductor so positioned adjacent said control element that movement of said element in said direction causes a variation in the inductance of said control inductor, a source of output current variable in accordance with changes in said control inductor and connected thereto, means energized by said output current for applying a force to said member in opposition to the displacement of said member, and a work circuit energized by said output current.*

*13. In an electro-mechanical system for measuring a variable, the combination including a displaceable member having a control element provided with a planar control surface and displaceable in an amount proportional to the change in the variable to be measured, torsionally resilient mounting means for supporting said member and including at least one element of substantially* T*-shaped cross section, angular displacement of said member causing movement of said control element in a direction substantially perpendicular to the plane of said control surface, a control inductor so positioned adjacent said control element that movement of said element in said direction causes a variation in the inductance of said control inductor, a source of output current variable in accordance with changes in said control inductor and connected thereto, means energized by said output current for applying a force to said member in opposition to the displacement of said member, and a work circuit energized by said output current.*

*14. The combination as set forth in claim 13 wherein said displaceable member is displaced in an amount proportional to the change in the variable to be measured by mechanical input means.*

*15. In an electro-mechanical system for measuring a variable, the combination including a displaceable member having a control element provided with a planar control surface, torsionally resilient mounting means for supporting said member and including at least one element of substantially* T*-shaped cross section, means for applying torque to said member in proportion to the variable to be measured, angular displacement of said member causing movement of said control element in a direction substantially perpendicular to the plane of said control surface, a control inductor so positioned adjacent said control element that movement of said element in said direction causes a variation in the inductance of said control inductor, an electrical oscillator connected to said control inductor and adapted to produce a direct current output which is variable in accordance with changes in*

*the inductance of said control inductor, means energized by said output current for applying a force to said member in opposition to said applied torque, and a work circuit energized by said output current.*

*16. The combination of claim 15, wherein said force applying means includes a feedback coil on said displaceable member and positioned in a magnetic field, and means for supplying said output current to said feedback coil.*

References Cited in the file of this patent or the original patent

UNITED STATES PATENTS

| | | |
|---|---|---|
| 1,191,416 | Gibson | July 18, 1916 |
| 1,827,560 | Binkley | Oct. 13, 1931 |
| 2,005,884 | Bernarde | June 25, 1935 |
| 2,103,741 | Bencowitz | Dec. 28, 1937 |
| 2,112,682 | Ryder | Mar. 29, 1938 |
| 2,117,894 | Lenehan | May 17, 1938 |
| 2,154,260 | Brandenburger | Apr. 11, 1939 |
| 2,212,085 | Tate | Aug. 20, 1940 |
| 2,231,570 | Ryder | Feb. 11, 1941 |
| 2,238,380 | Almen | Apr. 15, 1941 |
| 2,320,881 | Newton | June 1, 1943 |
| 2,360,751 | Ziebolz | Oct. 17, 1944 |
| 2,371,040 | Fisher et al. | Mar. 6, 1945 |

FOREIGN PATENTS

| | | |
|---|---|---|
| 195,229 | Great Britain | Mar. 29, 1923 |